March 7, 1950
C. A. REIMSCHISSEL
2,499,970
QUICK OPENING MECHANISM
Filed Oct. 21, 1944
3 Sheets-Sheet 1
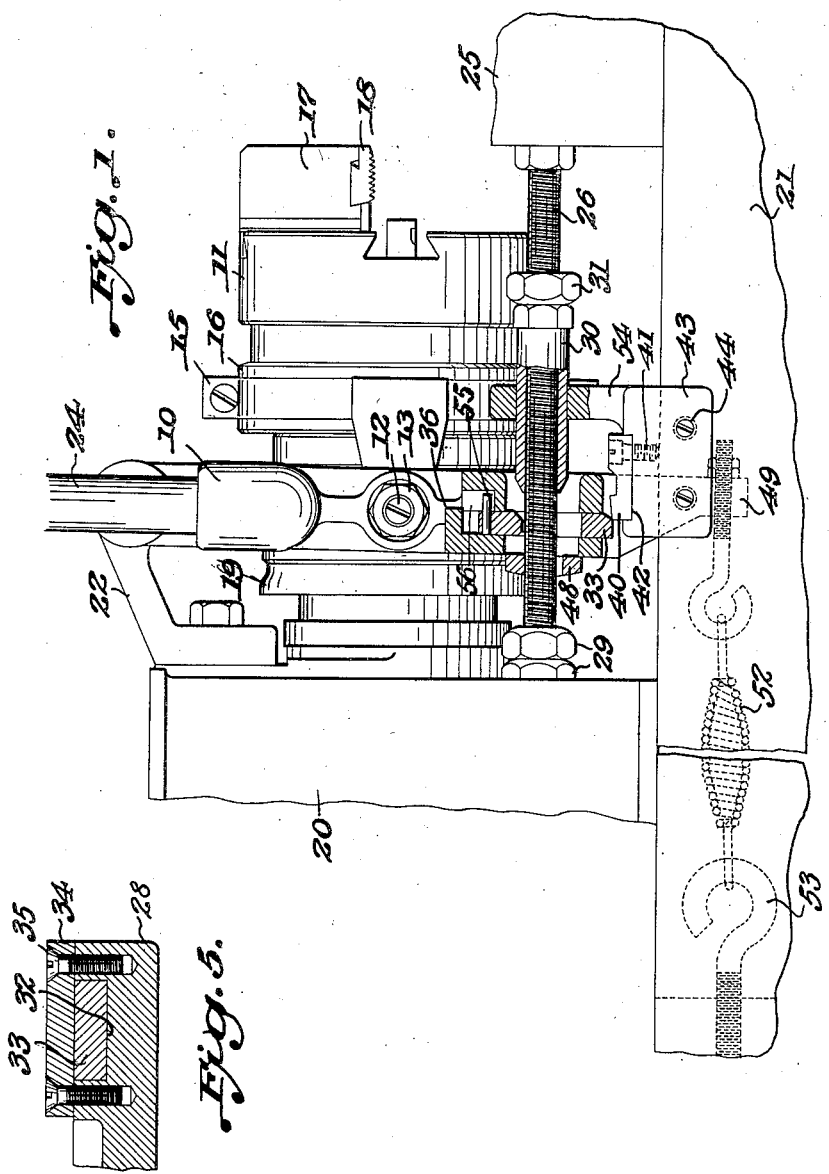
Inventor
C. A. Reimschissel
By *Ayabs Douce*
Attorney

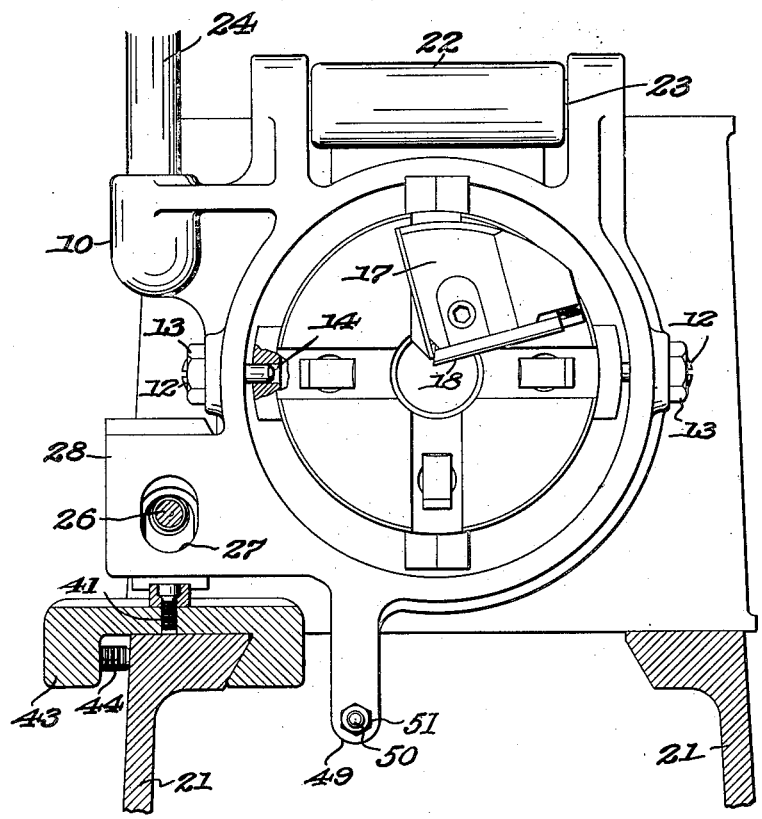
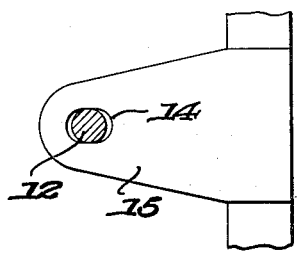

March 7, 1950   C. A. REIMSCHISSEL   2,499,970
QUICK OPENING MECHANISM
Filed Oct. 21, 1944   3 Sheets-Sheet 3
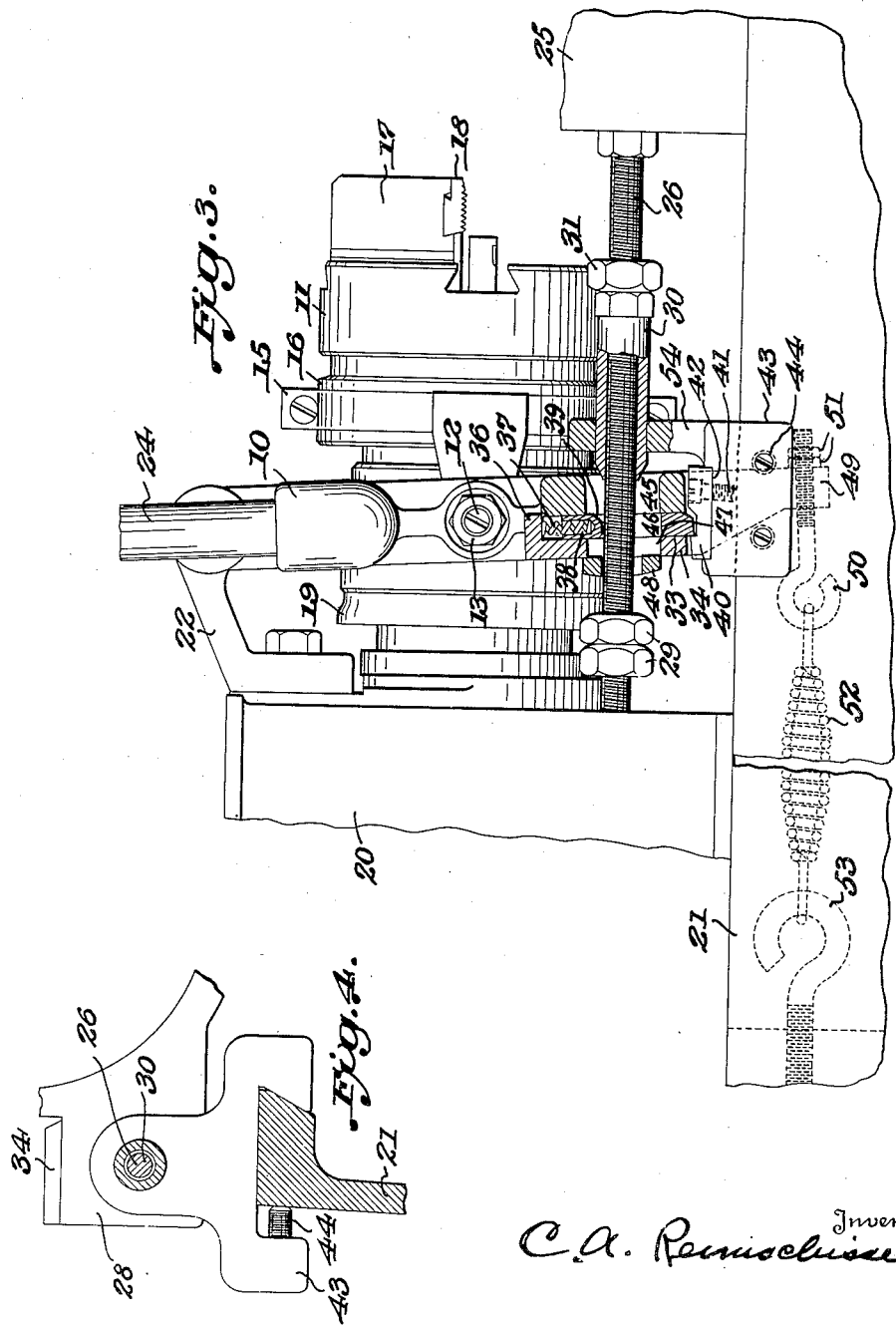
Inventor
C. A. Reimschissel
By A. Yates Dowell
Attorney Patented Mar. 7, 1950

2,499,970

UNITED STATES PATENT OFFICE 2,499,970

QUICK OPENING MECHANISM

Charles A. Reimschissel, Waynesboro, Pa., assignor to Landis Machine Company, Waynesboro, Pa., a corporation of Pennsylvania Application October 21, 1944, Serial No. 559,797

9 Claims. (Cl. 10—94)

This invention relates generally to the art of thread cutting and more particularly to thread cutting machines for forming threads on bodies such as, for example, rods, bolts, screws, pipes or the like. The invention relates specifically to thread cutting machines, each with a die head opened and closed by means of a yoke, which die head revolves and the work is firmly held in a carriage or work holding mechanism mounted for axial movement relative to the die head.

In existing machines of this character, the movement of the yoke necessary to open or close the die head is accomplished by a threaded rod carried by and projecting forwardly of the work holding mechanism, which threaded rod is provided with nuts or other preferably adjustable stops which engage and cause movement of the yoke upon predetermined movement of the work holding mechanism. Thus the length of the thread to be cut is determined by the movement of the work holder relative to the die head and the interval between the opening and the closing of the latter by the operation of the yoke.

Experience has taught that after a machine of the character described has been in use for some time the gradual movement of the work carrying mechanism and the yoke will cause an objectionable taper to be generated on the work toward the end of the threading operation. This is occasioned by the fact that the wear on the latching members in the die head permits them to open gradually instead of sharply. This gradual opening causes the chasers to recede slightly from their true positions before the head actually opens which naturally results in the production of tapered thread.

Among the objects of the invention is to overcome the aforementioned undesirable characteristics and to provide a structure in which the yoke will not be operated to open the die head until the complete thread has been cut and then will be operated to cause the die head to be opened instantaneously instead of gradually prior to the completion of the threading operation.

Another object of the invention is to provide a structure in which wear of the latching members, which has resulted from use, will not be reflected in the finished product in the form of variations in diameter of the thread cut.

A further object of the invention is to provide a die head which is opened and closed by means of a yoke with adjusting means to compensate for differences in the positions of the yoke on account of various diametrical settings of the cutting elements of the die head and also to provide for the cutting of threads of varying lengths with such mechanism.

A further object of the invention is to eliminate the necessity for the replacement of expensive latching members of die heads merely on account of a very small amount of wear which is nevertheless capable of effecting an undesired tapered thread in the manner above described.

Further objects and advantages of this invention will be apparent from the following specification taken in conjunction with the accompanying drawings, wherein:

Figure 1 is a side elevation, partly in section, of a die head and associated latching mechanism with the parts in unlatched or non-thread cutting position;

Fig. 2, a front elevation or face view of Fig. 1;

Fig. 3, a view similar to that of Fig. 1 but with the parts in latched or thread cutting position;

Fig. 4, a fragmentary front elevation of the latching mechanism, and a portion of the machine base in section;

Fig. 5, a fragmentary yoke section; and

Fig. 6, a fragmentary detail of the yoke.

Referring to the drawings, a yoke 10 is employed for operating a die head 11 of the character disclosed in U. S. Patent No. 2,082,757 issued to me June 1, 1937. The yoke is connected to the die head by means of pivot screws 12 adjustably retained in the yoke by means of nuts 13.

The plain cylindrical inner ends of the pivot screws 12 are received in the elongated openings 14 (see Fig. 6) in the yoke ring 15 which is seated in an annular groove in an operating ring 16. The operating ring 16 is fully described in the aforementioned patent, and controls the opening and closing of the die head, or in other words the radial movement of chaser holders 17 and thread cutting chasers 18.

The die head is secured in the customary manner to a revolving spindle 19 journalled within a headstock 20 supported upon the machine bed 21. The headstock 20 also supports yoke bracket 22 to which the yoke 10 is pivoted by means of the shaft 23. A yoke handle 24 is provided for manual operation of the yoke whenever the same is desired.

A work holding mechanism 25 is supported by the base 21 spaced axially from the face of the die head. This mechanism is provided with means, not shown, for movement axially relative to the die head for the purpose of introducing the work, upon which thread is to be cut, into the die head, as well as for withdrawing the work therefrom upon completion of the threading operation.

The work holding mechanism 25 forms a support for a threaded rod 26 which passes through an opening 45 in a laterally extending bracket 28 formed integrally with the yoke 10.

Trip nuts 29 are threadedly mounted upon the rod 26 rearwardly of the yoke 10, and a tripping sleeve 30 is threadedly mounted upon the rod 26 forwardly of the yoke 10, a lock nut 31 being provided for locking the tripping sleeve in an axially adjusted position.

The bracket 28 is formed with a vertical groove or slot 32 (Fig. 5) in its rear face, in which is slidably mounted a latch block 33. The latch block 33 is retained in place by a cover plate 34 fastened to the bracket 28 by means of screws 35. The cover plate 34 is formed with a forward extension 36 and closed at its top end, which extension closes the upper end of groove 32 and forms an abutting surface for the spring 37 seated in a socket 38 in the top surface of the latch member 33. The latch member is thereby urged resiliently downward into contact with the second latching component 40 which is secured by screws 41 in a transverse groove 42 in the bracket 43. The bracket 43 is adjustably secured by means of screws 44 to the side of the base of the machine 21.

It will be understood that the yoke 10 will have a swinging or pivoting movement on the shaft 23. Due to the various axial positions of the operating ring 16, occasioned by different diametrical settings of the die head, as well as the axial movement caused by the opening and closing of a die head, the openings 45, 46 and 47 in the bracket 28, latch block 33 and cover plate 34, respectively, are vertically elongated to permit the passage therethrough of the rod 26. The opening 46 in the latch block 33 is bevelled at 39 on its top edge for cooperation with the bevelled forward edge of the tripping sleeve 30.

A washer 48 is loosely held upon the rod 26 rearwardly of the yoke adjacent the cover plate 34. The rear face of the washer 48 is spherically rounded to avoid point contact with the nuts 29 when the yoke 10 is being reset. The yoke 10 is further provided with a depending extension 49, into which is loosely journalled the threaded shank of a spring hook 50, the effective length of which is adjustable by means of nuts 51. This adjustment controls the tension of a spring 52, connecting the adjustable hook 50 to the stationary hook 53 threadedly secured to the base of the machine. On account of this construction the lower end of the yoke 10 is constantly urged to swing rearwardly by the spring 52 and is restrained from such movement as shown in Fig. 3 by the engagement of the latch 33 and the notch of the latch member 40.

The bracket 43 is provided with an integral upwardly extending portion 54, which serves to support the sleeve 30 except when the sleeve is withdrawn from the bracket during a portion of the thread cutting operation during which time the sleeve is only supported from the work holding mechanism 25 by means of the threaded rod 26. Accordingly it has been found necessary to limit the downward movement of the latch 33 slightly to prevent the inside surface of the opening 46 of the latch from riding upon the threads of the rod 26 and wearing the same. This limitation of the downward movement of the latch is accomplished by a pin 55 imbedded in the upper portion of the latch 33 and extending into a vertically elongated recess 56 in the bracket 28. The bottom of the recess 56 limits the downward movement of the pin 55 and the latch 33.

With particular reference to Fig. 6, it will be seen that the connection between the pivot screw 12 and the arm of the yoke 15 is not a positive but, on the other hand, a lost motion connection, due to the fact that the opening 14 is elongated. This arrangement permits the bracket 43 and hence the latch member 40 to be adjusted to not exert any axial pressure upon the yoke ring 15 or the operating ring 16 in either direction when the die head is in locked position. This arrangement is necessary in order to insure the normal operation of the die head and the maintenance of the correct thread pitch diameter until the yoke latch members 33 and 40 are separated.

As pointed out above the die head 11 includes mechanism which locks the chasers 18 and chaser holders 17 in closed position during a thread cutting operation and the latch means provided by this invention for latching the yoke in a position corresponding to the closed position of the chasers is not intended to replace the latch member in the die head but is intended to prevent movement of the yoke 15 to open the chasers prior to the completion of the threading operation. For this reason the lost motion connection between the pivot screws 12 and the elongated slot 14 in the arm of the yoke 15 is provided to permit movement of the chasers to closed position by actuation of the handle 24 and yoke 15 and after closing of the chasers to permit slight retraction of the yoke 15 and engagement of the latch members 33 and 40 which prevents further retraction of the yoke. In other words, the closed position of the chasers 18 is determined by the latch mechanism within the die head 11 and not by the latch members 33 and 40, these latter members serving only to prevent rearward movement of the yoke until it is desired to open the chasers after completion of the threading operation.

In Fig. 3 the die head is illustrated in closed or thread cutting position with the latch 33 engaged in the notch of the latch member 40, while in Fig. 1 the latch has been released from the notch in the latch member 40.

The work holding mechanism is moved by any suitable means axially toward the die head so that the work is carried into position to be threaded between the chasers and threading is accomplished, the threaded rod 26 with the supported tripping sleeve 30 thereon being simultaneously advanced toward the latching members 33 and 40. The sleeve 30 having been axially adjusted so that the desired length thread will be cut, the bevelled forward end of the sleeve will lift the latch 33 against the pressure of the spring 37 and disengage it from the latching member 40. This will cause the yoke 10 to be instantly moved rearwardly by means of the spring 52, thus instantly disengaging the latching mechanism within the die head and instantly opening the die head without any further advancing of the work into the die head.

Resetting of the die head is accomplished automatically by the return travel of the work holding mechanism 25 and the rod 26, due to the engagement of the nuts 29 against the rear surface of the washer 48 which moves the yoke 10.

Since, in most die heads and in the one disclosed in the aforementioned patent in particular, a certain amount of relative rotary movement between certain rings is necessary to unlatch or expand the die head for quick removal of the threaded part and since the opening movement itself is usually axial as far as the rings are concerned, the latching members in the interior of the die head wear in a combination of the rotary and axial paths. This results, after wear, in a premature axial movement of the closing ring, allowing the chasers to expand gradually and produce a tapered thread.

As described in the foregoing patent, the complete separation of the yoke actuating mechanism from the die head locking mechanism prevents any movement of the operating ring until the yoke latch members are separated. The rearward motion of the operating ring is then sharp and instantaneous; a feature which precludes forming undesirable taper in the threads on the work.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. In a threading machine including a die head, work holder and yoke for indirectly initiating the opening and closing of said head, spring tension latching means exteriorly of the die head for latching the yoke under spring tension when the die head is in its locked position, said yoke latching means being adjustable to permit various settings of the yoke latching to accommodate full range diametrical adjustment of the die head, adjustable spring tension means attached to the yoke permitting various spring tensions to be used for actuating the yoke that the die head may open, a yoke ring mounted on the die head having a connection between the yoke permitting the yoke latch to be latched, and an adjustable tripping sleeve with a conical end mounted on a trip rod attached to the work holding member, and a bracket for guiding and supporting said tripping sleeve when the yoke member is being unlatched.

2. A threading machine comprising a frame, a die head rotatably mounted in said frame, radially movable chasers in said die head movable from a fully closed position to a fully open position, operating mechanism in said die head for moving said chasers and locking the same in fully closed position, a yoke pivotally mounted on said frame, means including a lost motion connection connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member in said yoke, an aperture in said latch member having a beveled edge, resilient means for urging said latch member to extended position, a fixed latch member adjustably mounted on said frame whereby after movement of said yoke to close said chasers said lost motion connection will permit said yoke to retract slightly and said retractable member to engage said fixed latch member and lock said yoke against movement by said yoke means, a work holder mounted on said frame for movement toward and from said die head, a yoke trip rod mounted on said work holder for movement therewith and slidably received in the aperture in said retractable latch member, a latch tripping sleeve adjustably mounted on said trip rod whereby upon completion of movement of said work holder toward said die head said sleeve will engage the beveled edge of said retractable latch member to disengage the same from said fixed latch member and permit said yoke and said chasers to instantly move to fully open position under the action of said yieldable means and adjustable abutment means on said trip rod engageable with said yoke upon movement of said work holder away from said die head to move said yoke and said chasers to fully closed position.

3. A threading machine comprising a frame, a die head rotatably mounted in said frame, chasers in said die head movable from a fully closed position to a fully open position, operating mechanism in said die head for moving said chasers and locking the same in fully closed position, a yoke pivotally mounted on said frame, means including a lost motion connection connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member on said yoke, resilient means for urging said latch member to extended position, a fixed latch member adjustably mounted on said frame whereby after movement of said yoke to close said chasers said lost motion connection will permit said yoke to retract slightly and said retractable latch member to engage with said fixed latch member and lock said yoke against movement by said yieldable means, a work holder mounted on said frame for movement toward and from said die head, a yoke trip rod mounted on said work holder for movement therewith, a latch tripping sleeve adjustably mounted on said trip rod whereby upon completion of movement of said work holder toward said die head said sleeve will engage said retractable latch member to disengage the same from said fixed latch member and permit said yoke and said chasers to instantly move to fully open position under the action of said yoke means and adjustable abutment means on said trip rod engageable with said yoke upon movement of said work holder away from said die head to move said yoke and said chasers to fully closed position.

4. A threading machine comprising a frame, a die head rotatably mounted in said frame, chasers in said die head movable from a fully closed position to a fully open position, operating mechanism in said die head for moving said chasers and locking the same in fully closed position, a yoke pivotally mounted on said frame, means including a lost motion connection connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member on said yoke, means for urging said latch member to extended position, a fixed latch member mounted on said frame whereby after movement of said yoke to close said chasers said lost motion connection will permit said yoke to retract slightly and said retractable latch member to engage said fixed latch member and lock said yoke against movement by said yieldable means, a work holder mounted on said frame for movement toward and from said die head, a yoke trip rod mounted on said work holder for movement therewith, a latch tripping sleeve adjustably mounted on said trip rod whereby upon completion of said movement of said work holder toward said die head said sleeve will engage said retractable latch member to disengage the same from said fixed latch member and permit said yoke and said chasers to instantly move to fully open position under the action of said yieldable means and adjustable abutment means on said trip rod engageable with said yoke upon movement of said work holder away from said die head to move said yoke and said chasers to fully closed position.

5. A threading machine comprising a frame, a die head rotatably mounted in said frame, chasers in said die head movable from a fully closed position to a fully open position, operating mechanism in said die head for moving said chasers and locking the same in fully closed position, a yoke pivotally mounted on said frame, means including a lost motion connection connecting said yoke to said operating mechanism whereby upon movement of said yoke in one direction said chasers will be moved to fully closed position and upon movement in the opposite direction said chasers will be moved toward fully open position, yieldable means attached to said frame and said yoke to urge said yoke and chasers toward fully open position, a retractable latch member on said yoke, means for urging said latch member to extended position, a fixed latch member mounted on said frame whereby after movement of said yoke to close said chasers said lost motion connection will permit said yoke to retract slightly and said retractable latch member to engage said fixed latch member and lock said yoke against movement by said yieldable means, a work holder mounted on said frame for movement toward and from said die head, a yoke trip rod mounted on said work holder for movement therewith, a latch trip means adjustably mounted on said trip rod whereby upon completion of movement of said work holder toward said die head said tripping means will engage said retractable latch member to disengage the same from said fixed latch member and permit said yoke and said chasers to instantly move toward fully open position under the action of said yieldable means and adjustable abutment means on said trip rod engageable with said yoke upon movement of said work holder away from said die head to move said yoke and said chasers toward fully closed position.

6. A threading machine comprising a frame, a die head rotatably mounted in said frame, chasers in said die head movable from a fully closed position to fully open position, operating mechanism in said die head for moving said chasers and locking the same in fully closed position, a yoke pivotally mounted on said frame, means including a lost motion connection connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member on said yoke, affixed latch member mounted on said frame whereby after movement of said yoke to close said chasers said lost motion connection will permit said yoke to retract slightly and said retractable latch member to engage said fixed latch member and lock said yoke against movement by said yieldable means, a work holder mounted on said frame for movement toward and from said die head, a yoke trip rod mounted on said work holder for movement therewith, a latch tripping means mounted on said trip rod whereby upon completion of movement of said work holder toward said die head said tripping means will engage said retractable latch member to disengage the same from said fixed latch member and permit said yoke and said chasers to instantly move towards fully open position under the action of said yieldable means.

7. A threading machine comprising a frame, a die head rotatably mounted in said frame, chasers in said die head movable from a fully closed position to fully open position, operating mechanism in said die head for moving said chasers and locking the same in fully closed position, a yoke pivotally mounted on said frame, means connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member on said yoke, an aperture in said latch member having a beveled edge, resilient means for urging said latch member to extended position, a fixed latch member adjustably mounted on said frame whereby upon movement of said yoke to close said chasers said retractable latch member will engage said fixed latch member and lock said yoke against movement by said yieldable means, a work holder mounted on said frame for movement toward and from said die head, a yoke trip rod mounted on said work holder for movement therewith and slidably received in said aperture in said latch member, a latch tripping sleeve adjustably mounted on said trip rod whereby upon completion of movement of said work holder toward said die head said sleeve will engage the beveled edge of said retractable latch member to disengage the same from said fixed latch member and permit said yoke and said chasers to instantly move to fully open position under the action of said yieldable means and adjustable abutment means on said trip rod engageable with said yoke upon movement of said work holder away from said die head to move said yoke and said chasers to fully closed position.

8. A threading machine comprising a frame, a die head rotatably mounted in said frame, chasers in said die head movable from a fully closed position to a fully open position, operating mechanism in said die head for moving said chasers and locking the same in fully closed position, a yoke pivotally mounted on said frame, means connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member on said yoke, an aperture in said latch member, a fixed latch member mounted on said frame whereby upon movement of said yoke to close said chasers said retractable latch member will engage said fixed latch member and lock said yoke against movement by said yieldable means, a work holder mounted on said frame for movement toward and from said die head, a yoke trip rod mounted on said work holder for movement therewith and slidably received in the aperture of said latch member, a latch tripping means mounted on said trip rod whereby upon completion of movement of said work holder toward said die head said tripping means will engage said retractable latch member to disengage the same from said fixed latch member and permit said yoke and said chasers to instantly move toward fully open position under the action of said yieldable means and adjustable abutment means on said trip rod engageable with said yoke upon movement of said work holder away from said die head to move said yoke and said chasers to fully closed position.

9. A threading machine comprising a frame, a die head rotatably mounted in said frame, chasers in said die head movable from a fully closed position to a fully open position, operating mechanism in said die head for moving said chasers and locking the same in fully closed position, a yoke pivotally mounted on said frame, means connecting said yoke and said operating mechanism whereby upon movement of said yoke in one direction said chasers will be moved to fully closed position and upon movement in the opposite direction said chasers will be moved to fully open position, yieldable means attached to said frame and said yoke to urge said yoke and chasers toward fully open position, a retractable latch member on said yoke, an aperture in said latch member, a fixed latch member mounted on said frame whereby upon movement of said yoke to close said chasers said retractable latch member will engage said fixed latch member and lock said yoke against movement by said yieldable means, a work holder mounted on said frame for movement toward and from said die head, a yoke trip rod mounted on said work holder for movement therewith and slidably received in the aperture of said latch member, a latch tripping means mounted on said trip rod whereby upon completion of movement of said work holder toward said die head said tripping means will engage said retractable latch member to disengage the same from said fixed latch member and permit said yoke and said chasers to instantly move toward fully open position under the action of said yieldable means.

CHARLES A. REIMSCHISSEL.

REFERENCES CITED

The following references are of record in the file of this patent:

UNITED STATES PATENTS

| Number | Name | Date |
| --- | --- | --- |
| 432,033 | Goldthwait | July 15, 1890 |
| 1,108,798 | Schultis | Aug. 25, 1914 |
| 1,212,508 | Koontz | Jan. 16, 1917 |
| 1,867,192 | Strickland | July 12, 1932 |
| 2,024,278 | Drissner et al. | Dec. 17, 1935 |
| 2,054,028 | Benninghoff | Sept. 8, 1936 |
| 2,082,757 | Reimschissel | June 1, 1937 |
| 2,093,507 | Bartek | Sept. 21, 1937 |
| 2,163,598 | Hogg | June 27, 1939 |
| 2,283,280 | Nell | May 19, 1942 |
| 2,291,919 | Reimschissel | Aug. 4, 1942 |

FOREIGN PATENTS

| Number | Country | Date |
| --- | --- | --- |
| 1,296 | Great Britain | Apr. 8, 1873 |
| 10,026 | Great Britain | May 8, 1908 |
| 16,158 | Great Britain | July 10, 1912 |
| 289,627 | Great Britain | May 3, 1928 |
| 339,901 | Germany | Aug. 18, 1921 |
| 464,071 | Germany | Aug. 8, 1928 |